US009784647B2

(12) United States Patent
Sidles

(10) Patent No.: US 9,784,647 B2
(45) Date of Patent: Oct. 10, 2017

(54) WEAR SENSING DEVICE HAVING A HOUSING

(71) Applicant: Caterpillar Inc., Peoria, IL (US)

(72) Inventor: Timothy Gibbs Sidles, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 280 days.

(21) Appl. No.: 14/576,806

(22) Filed: Dec. 19, 2014

(65) Prior Publication Data

US 2016/0178483 A1 Jun. 23, 2016

(51) Int. Cl.
*G01M 17/007* (2006.01)
*G01M 17/03* (2006.01)
*E02F 9/26* (2006.01)
*E02F 9/28* (2006.01)

(52) U.S. Cl.
CPC ............. *G01M 17/03* (2013.01); *E02F 9/26* (2013.01); *E02F 9/2883* (2013.01)

(58) Field of Classification Search
USPC ............................. 73/115.01, 115.07, 117.01
See application file for complete search history.

(56) References Cited

U.S. PATENT DOCUMENTS

| 5,608,376 | A | 3/1997 | Ito et al. |
| 5,637,794 | A | 6/1997 | Hanisko |
| 6,250,429 | B1 | 6/2001 | Kramer |
| 6,360,850 | B1 | 3/2002 | Odisho et al. |
| 6,460,659 | B1 | 10/2002 | Schaffer et al. |
| 6,477,893 | B1 | 11/2002 | Djordjevic |
| 6,564,909 | B1 | 5/2003 | Razzano |
| 9,371,630 | B1* | 6/2016 | Johannsen ........... G07C 5/0808 |
| 2004/0168864 | A1 | 9/2004 | Strauss et al. |
| 2006/0042734 | A1 | 3/2006 | Turner et al. |
| 2006/0273148 | A1 | 12/2006 | Karstens |
| 2011/0169651 | A1* | 7/2011 | Mitchell ................. F04C 14/00 340/679 |
| 2014/0324301 | A1 | 10/2014 | Rebinsky |
| 2015/0066291 | A1* | 3/2015 | Johannsen ............. B62D 55/32 701/34.4 |
| 2015/0081166 | A1* | 3/2015 | Diekevers .............. B62D 55/14 701/34.4 |
| 2016/0052572 | A1* | 2/2016 | McKinley .............. B62D 55/21 305/15 |
| 2016/0221618 | A1* | 8/2016 | Sidles .................... B62D 55/08 |

FOREIGN PATENT DOCUMENTS

WO 2013049513 4/2013

* cited by examiner

*Primary Examiner* — Eric S McCall
(74) *Attorney, Agent, or Firm* — Finnegan, Henderson, Farabow, Garrett & Dunner, LLP; James S. Bennin

(57) ABSTRACT

A wear sensing device is disclosed. The wear sensing device may have a wear sensor. The wear sensor may have plurality of wear members, a communication device, and a processing device. The processing device may be configured to generate a signal indicative of wear, based on a state of the plurality of wear members. The processing device may be further configured transmit the signal with the communication device. The wear sensing device may further have a housing. The housing may at least partially enclose the wear sensor and include a plurality of separate slots. The plurality of wear members may be positioned in the plurality of separate slots.

20 Claims, 5 Drawing Sheets

WEAR SENSING DEVICE HAVING A HOUSING

TECHNICAL FIELD

The present disclosure is directed to a wear sensing device and, more particularly, to a wear sensing device having a housing.

BACKGROUND

A mobile machine may be used to perform various types of work on different worksites, such as a construction site, a demolition site, a mining site, or a landfill site. For example, a bulldozer may be used to push soil and rock on a construction site. The bulldozer, as a track-type mobile machine, includes a tracked undercarriage with tracks on the left and right sides of the machine. Each of the tracks includes a chain formed by connecting a number of track links to one another, and connecting a number of track shoes to the chains. The tracks are supported by various roller assemblies on both sides of the machine.

Operation of the mobile machine inevitably results in wear or damage to various components, including components of the undercarriage such as the track links and the roller assemblies, as well as other components, such as ground-engaging tools. For example, as a track assembly operates, a surface of each track link may wear away through contact with other components of the track assembly, machine, and/or outside materials (e.g., the ground). Similarly, surfaces of work tools and associated components may wear away during use. It is known to service or replace a machine component, for example, when the component exceeds its expected lifetime (based on the age of the component or number of hours of use experienced by the component), or based on the results of inspection or evaluation of the component.

However, in order to monitor an amount of wear experienced by a component, various wear sensing devices have been developed. One such wear sensing device is described in U.S. Pat. No. 5,637,794, which issued to Hanisko on Jun. 10, 1997 ("the '794 patent"). The '794 patent discloses a brake lining wear sensor that has a plurality of serially connected wear members. As the brake lining wears, the wear sensor is also worn, periodically breaking the wear members. A control unit is connected to the wear sensor and determines an amount of wear that has occurred based on a state of the wear members.

While the wear sensor of the '794 patent may allow for detection of wear, it may be less than ideal. For example, the wear sensor of the '794 patent includes a group of several wear members in series, rendering it difficult to properly position each loop within the sensor such that the loops are correctly spaced apart. Further, the grouping may not allow for sufficient protection of each loop, possibility leading to premature breakage (e.g., breakage before a corresponding amount of wear occurs). In addition, the wear sensor, designed for measuring wear associated with a break lining, may not be well suited for other applications. For example, the wear sensor of the '794 patent includes a wired connection to a control unit, which may be impractical for some applications.

The present disclosure is directed to overcoming one or more of the problems set forth above and/or other problems of the prior art.

SUMMARY

In one aspect, a wear sensing device is disclosed. The wear sensing device may include a wear sensor including a plurality of wear members, a communication device, and a processing device. The processing device may be configured to generate a signal indicative of wear based on a state of the plurality of wear members, and transmit the signal with the communication device. The wear sensing device may also include a housing at least partially enclosing the wear sensor and including a plurality of separate slots. The plurality of wear members may be positioned in the plurality of separate slots.

In another aspect, a machine component is disclosed. The machine component may include a component body including a wear surface. The machine component may also include a wear sensing device. The wear sensing device may include a wear sensor, a communication device, and a processing device. The wear sensor may include a plurality of wear members. The processing device may be configured to generate a signal indicative of wear based on a state of the plurality of wear members, and transmit the signal with the communication device. The wear sensing device may further include a housing at least partially enclosing the wear sensor and processing device, and including a plurality of slots having the plurality of wear members separately positioned therein. The housing may also include a surface that is continuous with the wear surface. The housing may further include a material configured to wear at substantially the same rate as the wear surface.

In yet another aspect, a machine is disclosed. The machine may include a frame, and a track assembly including a drive sprocket, a chain assembly, a traction assembly, an idler assembly, and a roller assembly, the track assembly configured to propel the machine. The chain assembly may include a track link. The track link may include a component body including a wear surface, and a wear sensing device. The wear sensing device may include a wear sensor including a plurality of wear members, a communication device, a processing device configured to generate a signal indicative of wear based on a state of the plurality of wear members, and transmit the signal with the communication device, and a housing at least partially enclosing the wear sensor and processing device. The housing may include a first section including a plurality of slots having the plurality of wear members separately positioned therein and including a surface that is continuous with the wear surface. The housing may also include a second section adjacent to the communication device. The first section may include a material configured to wear at substantially the same rate as the wear surface, and the second section may include a material, different from the material of the first section, that is configured to allow transmission of a signal therethrough.

DETAILED DESCRIPTION

Figure 1:
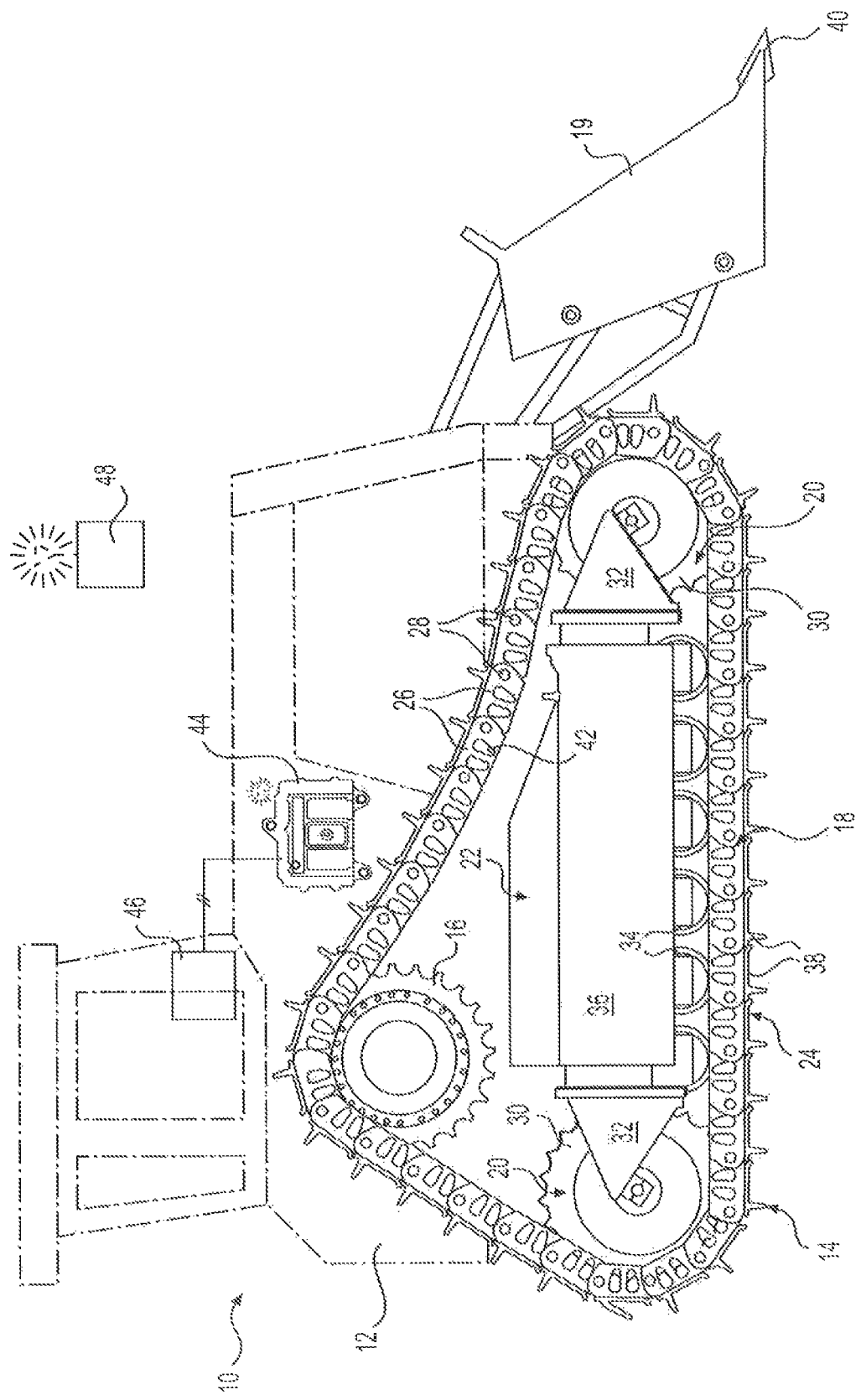
FIG. 1 illustrates an exemplary track-type machine, consistent with disclosed embodiments.

FIG. 1 illustrates an exemplary track-type machine 10, consistent with disclosed embodiments. The track-type machine 10 may embody any machine that is driven, propelled, positioned, and/or maneuvered by operating a "continuous" track-type traction device. Such machines may include, for example, track-type tractors, skid steers, dozers, excavators, backhoes, track loaders, front shovels, rope shovels, or any other type of track-maneuverable machine. The machine 10 may include a frame 12 and a pair of track assemblies 14 (only one shown) secured to the frame 12 on opposing sides of the machine 10. The track assembly 14 may include a drive sprocket 16 coupled to the driving mechanism (not shown), and a chain assembly 18 operatively coupled to the driving mechanism by the drive sprocket 16 and configured to propel the machine 10. The machine 10 may also include a work tool 19.

The driving mechanism may include one or more components configured to generate a torque output. For example, the driving mechanism may include any suitable type of internal combustion engine, such as a gasoline, diesel, natural gas, or hybrid-powered engine or turbine. Alternatively or additionally, the driving mechanism may embody an electric motor, electrically coupled to an electric power source and configured to convert at least a portion of the electrical energy from the electric power output into mechanical energy. According to yet another embodiment, the driving mechanism may include a hydraulic motor fluidly coupled to a hydraulic pump and configured to convert a fluid pressurized by the pump into a torque output.

The drive sprocket 16 may be coupled to the driving mechanism via a shaft, which may provide an interface for delivering torque generated by the driving mechanism to the drive sprocket 16. For example, the drive sprocket 16 may be secured (e.g., welded, bolted, heat-coupled, etc) to a hub associated with a shaft, so that the drive sprocket 16 rotates in response to the torque generated by the driving mechanism. In some embodiments, the drive sprocket 16 may be directly coupled via a drive shaft to the driving mechanism. Alternatively, the drive sprocket 16 may be coupled to the driving mechanism via a torque converter (such as a gearbox, transmission, etc.), so that rotation of the drive sprocket 16 is proportional to the torque generated by the driving mechanism.

The track assembly 14 may include a plurality of components that form the "continuous" track, ground-engaging portion of the drive system of the machine 10. The track assembly 14 may include, among other things, the drive sprocket 16, the chain assembly 18, at least one idler assembly 20, a roller assembly 22, and a traction assembly 24. However, it should be understood that these components of the track assembly 14 are exemplary only and not intended to be limiting. Accordingly, the track assembly 14 may include additional and/or different components than those listed above.

The chain assembly 18 may form a continuous chain connected around outer portions of the drive sprocket 16, the idler assemblies 20, and the roller assembly 22. The traction assembly 24 may be connected to an outer portion of the chain assembly 18 and configured to engage a ground surface beneath the track-type machine 10. In use, rotation of the drive sprocket 16 may cause the chain assembly 18 to move around the drive sprocket 16, the idler assemblies 20, and the roller assembly 22, causing the traction assembly 24 to engage the ground and thereby propel track-type machine 10 in a manner known in the art.

In an exemplary embodiment, the chain assembly 18 may include a plurality of interconnected track links 26. It should be understood that "track link," as used herein, refers to any linkage component of a continuous chain for a track-type machine, and is not limited to track links 26 described herein, in one embodiment, adjacent (e.g., consecutive) track links 26 may be coupled via a plurality of track pin assemblies 28. In an exemplary embodiment, the chain assembly 18 may include two parallel sets of track links, connected to each other by the track pin assemblies 2S in a manner known in the art.

The idler assemblies 20 may include components configured to guide the chain assembly 18 as it moves around the track assembly 14. For example, each of the idler assemblies 20 may include an idler 30 and a mount 32. The idlers 30 may include features configured to engage the chain assembly 18. For example, the idlers 30 may include engagement surfaces configured to contact and guide the track links 26 as they pass around the idler 30. In some embodiments (such as the idler 30 shown in FIG. 1), the idler 30 may include idler teeth (e.g., between the engagement surfaces) configured to engage the track pin assemblies 28. In other embodiments, the engagement surfaces may be separated by a flange. The mounts 32 may hold each of the idlers 30 in place on the machine 10 through connection to the frame 12.

The roller assembly 22 may also include components configured to guide the chain assembly 18. For example, the roller assembly 22 may include, a plurality of rollers 34 and a roller frame 36. The roller frame 36 may be mounted to the frame 12 of the machine 10. The rollers 34 may guide the chain assembly 18 at a lower side of the roller frame 36. The rollers 34 may each be suspended from the roller frame 36. For example, each of the rollers 34 may be rotationally supported on an axle suspended below the roller frame 36. The rollers 34 may ride on and guide the track links 26 as they pass under the roller frame 36. In some embodiments, track assembly 14 may also include one or more carrier rollers (not shown), configured to support a portion of chain assembly 18.

The traction assembly 24 may include a plurality of track shoes 38 carried by the chain assembly 18. In some embodiments, the track shoes 38 may be separate from the chain assembly 18 and include a connecting portion configured to be secured to one or more of the track links 26 and a ground-engaging portion configured to contact the ground. In other embodiments, individual track shoes 38 and track links 26 may be integrally formed as one piece. The ground-engaging portion of the track shoes 38 may include one or more features (e.g., grouser bars) that provide increased traction between the track shoes 38 and the ground. It should be understood, however, that the disclosed embodiments may be used with any type of track shoe forming a part of a track assembly used by a track-type mobile machine. In other embodiments, the track shoes 38 may be omitted entirely from the track assembly 14, so that surfaces of the track links 26 that would otherwise contact the track shoes 38 may contact the ground surface under the machine 10.

The work tool 19 may include any device used to perform a particular task. For example, the work tool 19 may include a bucket, a plow, a blade, or another task-performing device known in the art. The work tool 19 may include a ground-engaging member 40, such as an edge protector, tooth member, etc. The ground-engaging member 40 may be configured to contact the ground (or other working material) during performance of a task, and may be replaceable, such as for when the ground-engaging member 40 is worn.

In an exemplary embodiment, the track-type machine 10 may include one or more components of a detection system configured to monitor a parameter of the track assembly 14. For example, the track-type machine 10 may include at least one sensing device 42 and a controller 44. The sensing device 42 may be an electronic device configured to detect a parameter associated with use of the machine 10 and transmit a signal indicative of the parameter to the controller 44. The controller 44 may be configured to forward information received from the sensing device 42 to another device, such as an on-board computer 46 or off-board computer 48. In this way, information associated with a parameter of the machine 10 may be automatically determined and routed to an appropriate destination (e.g., for display to an operator).

In an exemplary embodiment, the detection system may be configured to monitor a wear parameter. For example, the sensing device 42 may be configured to measure a parameter associated with an amount of wear experienced by a component of the machine 10 and transmit a signal indicative of the amount of wear to the controller 44. As used herein, a "wear parameter" is a measurement or other characteristic of a monitored component or the sensing device 42 that may indicate an amount of wear experienced by the monitored component (when compared to a previous measurement or other previous characteristic, for example) and/or an amount of expected life remaining.

In an exemplary embodiment, the sensing device 42 may be mounted in, on, or around a component of the machine 10 and configured to detect a wear parameter thereof. For example, the sensing device 42 may be configured to detect a wear parameter associated with wear of at least one surface of a body of a component of machine 10. In an exemplary embodiment, the sensing device 42 may be secured to a track link 26. In one embodiment, the sensing device 42 may be at least partially embedded in the body of the track link 26. In another embodiment, the sensing device 42 may be externally mounted to the body of the track link 26. While the sensing device 42 is described in relation to a track link 26, it should be understood that the sensing device 42 may be mounted to another component of the machine 10 that experiences wear, such as an idler 30, a roller 34, or a ground-engaging member 40.

The controller 44 may include one or more computing devices, such as a one or more microprocessors. For example, the controller 44 may embody a general microprocessor capable of controlling numerous machine functions, including wear monitoring. The controller 44 may also include all of the components required to run an application such as, for example, a computer-readable memory, a secondary storage device, and a processor, such as a central processing unit. Various other known circuits may be associated with the controller 44, including power source and other appropriate circuitry. In addition, the controller 44 may include communication hardware and/or software configured to perform one or more processes to allow the controller 44 to communicate (e.g., wirelessly or through a wired connection) with the sensing device 42 and at least one of the on-board computer 46 and the off-board computer 48.

The on-board computer 46 may be a computing device located on the machine 10 (e.g., inside the operator cabin). For example, the on-board computer 46 may be a dashboard computer including at least a processor and a display. The on-board computer 46 may communicate with the controller 44 (e.g., via a wired or wireless connection) to receive wear parameter information. The on-board computer 46 may display wear parameter information (e.g., to an operator of the machine 10).

The off-board computer 48 may be a similar computing device located away from the machine 10 (e.g., inside a control building). The off-board computer 48 may also include at least a processor and a display. The off-board computer 48 may be configured to communicate with the controller 44 and/or the on-board computer 46 (e.g., via a wireless network) to similarly receive wear parameter information, which may be displayed to an operator (e.g., a machine supervisor) away from the machine 10.

Figure 2:
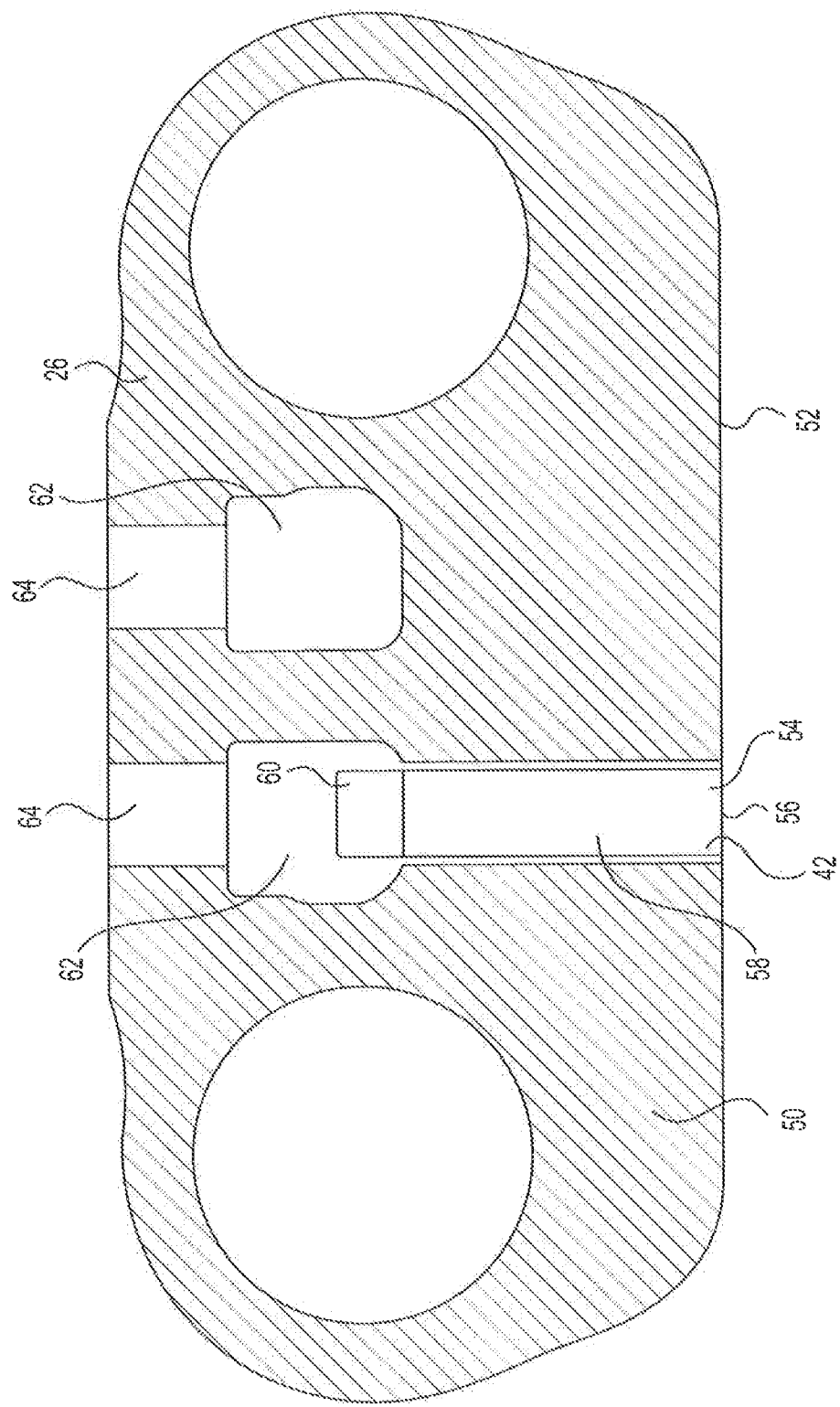
FIG. 2 illustrates a cross-sectional view of a track link having a sensing device, consistent with disclosed embodiments.

FIG. 2 illustrates an exemplary track link 26 that includes the sensing device 42. The sensing device 42 may be configured to transmit a signal indicative of a wear parameter to the controller 44. The controller 44 may be configured to receive the signal and perform one or more processes to detect wear of the track link 26, such as by comparing the wear parameter to stored information and/or transmitting a corresponding signal to the on-board computer 46 and/or the off-board computer 48.

In an exemplary embodiment, the sensing device 42 may be arranged within a body 50 of the track link 26 and configured to measure a wear parameter associated with a surface 52. The surface 52 may be an engagement surface of the track link 26, configured to contact other components of the track assembly 14 (e.g., the rollers 34) as the chain assembly 18 moves around the track assembly 14 to move the machine 10. The sensing device 42 may include a housing 54 in contact with the track link 26 and containing sensing components of the sensing device 42. The housing 54 may include a surface 56 that is continuous with the surface 52, such that the surfaces 52 and 56 wear together. In this way, the sensing device 42 may measure a wear parameter of the housing 54, which may be representative of an amount of wear experienced by the track link 26.

In some embodiments, the housing 54 may include a first section 58 and a second section 60. The first section 58 may include the surface 56, while the second section 60 may be positioned at an opposite end from the surface 56. In an exemplary embodiment, the first section 58 may be formed from a material that wears at substantially the same rate as the track link 26 (e.g., the same material), so that the surfaces 52 and 56 wear at the same rate. In addition, the material may be selected to protect the components of the sensing device 42 held therein. For example, the first section 58 may be made from the same metal material from which link body 50 is made.

The second section 60, on the other hand, may be formed from a material that promotes efficient wireless communication by the sensing device 42. For example, the second section 60 may be formed from a polymer material (e.g., plastic) that is substantially transparent to wireless signals. In this way, the sensing device 42 may wirelessly communicate with the controller 44 in a reliable manner. That is, the housing 54 may protect the sensing components of the sensing device 42, while not inhibiting wireless communication. In some embodiments, the second section 60 may include a cap configured to cover an end of the first section 58.

In an exemplary embodiment, the second section 60 may be positioned in a location that allows for reliable communication with the controller 44. As shown in FIG. 2, the track link 26 may include a pair of link windows 62, which may be configured to receive ends of mechanical fasteners (e.g., bolts) inserted through bores 64 that connect the track link 26 to another component (e.g., a track shoe 38). The link windows 62 allow a nut to be placed on an end of the mechanical fasteners, securing the connection. In one embodiment, the second section 60 may be positioned in one of the link windows 62, thereby being exposed for communication with the controller 44.

Figure 3:
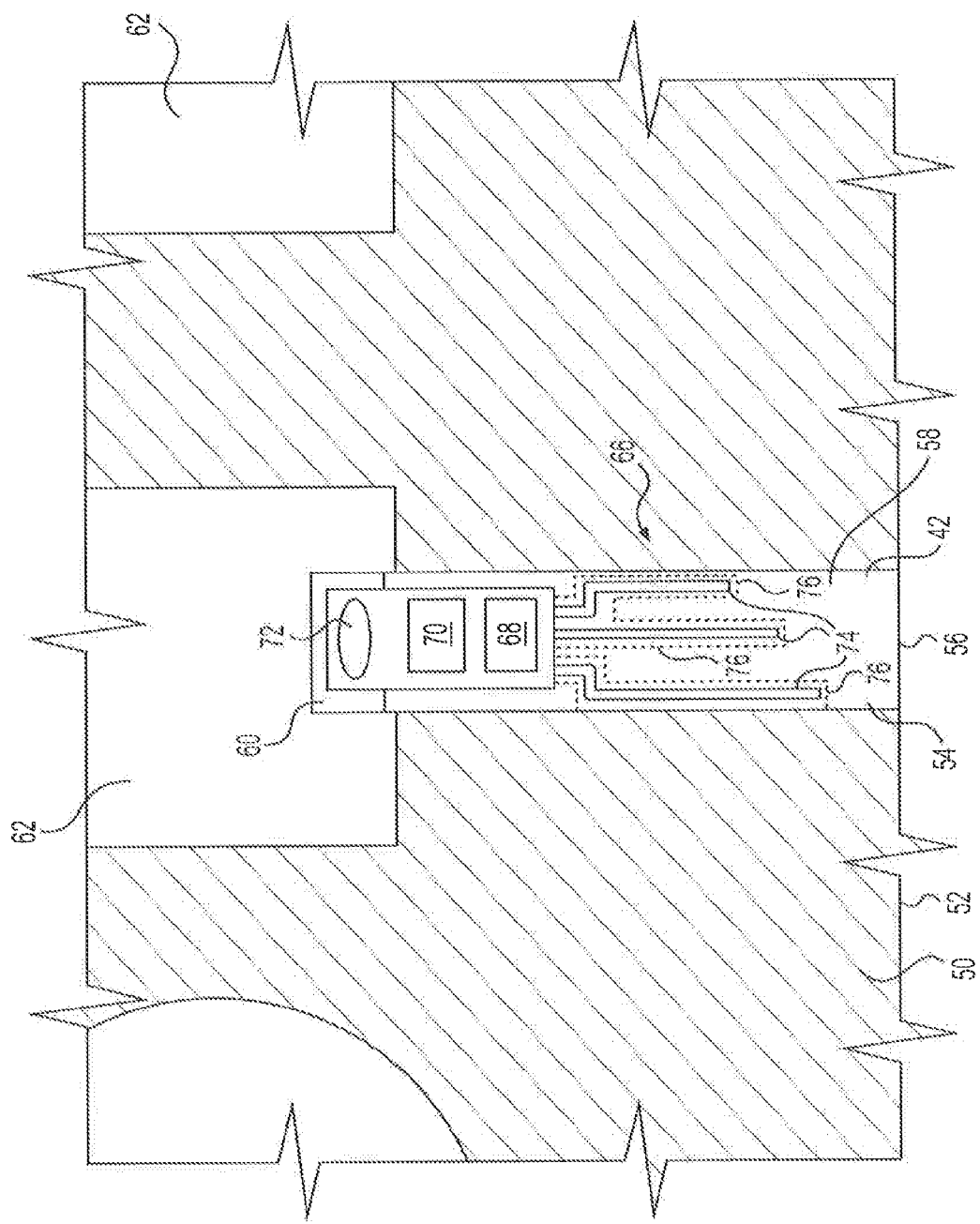
FIG. 3 illustrates a cross-sectional view of a housing for the sensing device of FIG. 2, consistent with disclosed embodiments.

FIG. 3 depicts the sensing device 42 within the track link 26, further depicting the components of the sensing device 42. In an exemplary embodiment, the sensing device 42 may include at least a wear sensor 66, a processing device 68, a power source 70, and a communication device 72. The manner in which the sensing device 42 detects a wear parameter may depend on the configuration of the sensing device 42 and, in particular, the configuration of the wear sensor 66. It should be understood that the sensing device 42 is not limited to the configurations described herein, and may include other configurations that allow the sensing device 42 to detect a wear parameter of the surface 52.

In one embodiment, the wear sensor 66 may be positioned adjacent to the surface 56 such that, as the surface 56 wears, the wear sensor 66 also wears. The sensing device 42 may be configured such that the change in structure of the wear sensor 66 due to the wear of the surface 56 allows the sensing device 42 to determine an amount of wear that has occurred (e.g., correlate a dimension, structure, and/or state of the wear sensor 66 with an amount of material at the surface 56 that must have been removed to result in that dimension, structure, and/or state).

In one embodiment, the wear sensor 66 may include at least one wear member 74 electrically connected to the processing device 68, such that the processing device 68 may be configured to detect a state of the at least one wear member 74. For example, wear member 74 may be a resistive wire loop, such that, as surface 56 wears, the wear may eventually reach the wear member 74, breaking the wire loop. The processing device 68 may be configured to detect this change (e.g., by measuring a change in resistance), to determine that wear has advanced far enough to break the wear member 74. In an exemplary embodiment, the wear sensor 66 may include a plurality of wear members 74, each positioned to break at a different corresponding amount of wear. Each wear member 74 may be positioned within a slot 76 formed in the housing 54, as will be described in more detail below. In an exemplary embodiment, the sensing device 42 may include a plurality of the wear members 74, separately positioned in a plurality of the slots 76.

In another embodiment, the sensing device 42 may detect a wear parameter by measuring a distance from a set point (e.g., an end of the sensing device 42) to the surface 56. For example, wear sensor 66 may include a depth sensor that uses ultrasonic waves, sound waves, lasers, etc. to determine a distance from the wear sensor 66 to the surface 56. As the surface 56 wears away, this distance will change, and an amount of material worn away from the surface 56 (and, thus, the surface 52) may be determined.

The processing device 68 may be configured to generate, receive, transmit, and/or modify a signal indicative of a wear parameter detected by the wear sensor 66. For example, the processing device 68 may include a signal conditioner, an amplifier, a multiplexer, and/or a converter (e.g., an analog-to-digital (A/D) converter or a digital-to-analog (D/A) converter). In some embodiments, the processing device 68 may also include a controller, such as a low-power microcontroller, that may provide an output in response to the input received from wear sensor 66 and/or one or more signals processed by any or all of the other processing device 68. The processing device 68 may further include a memory device, such as either or both of a random-access memory (RAM) and a read-only memory (ROM), which may store information related to operation of the sensing device 42. Alternatively or additionally, the memory device may store instructions used by one or more other components of the sensing device 42, such as the processing device 68.

The power source 70 may provide power to one or more of the components of the sensing device 42. In one embodiment, power source 70 may include a battery, such as a coin-cell type battery. In some embodiments, the power source 70 may additionally or alternatively include a motion-based energy source, such as a vibration-based energy-harvesting system, to power one or more of the components of the sensing device 42, and/or may be used to charge a battery of the power source 70. In yet another embodiment, the power source 70 may include a battery capable of being wirelessly charged (e.g., near field charging). In this way, the sensing device 42 may be embedded within the link body 50 while being capable of receiving electrical power from outside of the link body 50, and thus reducing on-board power (e.g., battery) requirements.

In one embodiment, the communication device 72 may be a transceiver, such as for example a radio-frequency (RF) transceiver, which may wirelessly broadcast the output provided by the processing device 68 (e.g., to the controller 44). Alternatively or additionally, an output port (not shown), such as for example a USB (universal serial bus) port or similar port, may transmit the output provided by the processing device 68 through a cable or other connection removably connected to the output port.

Figure 4:
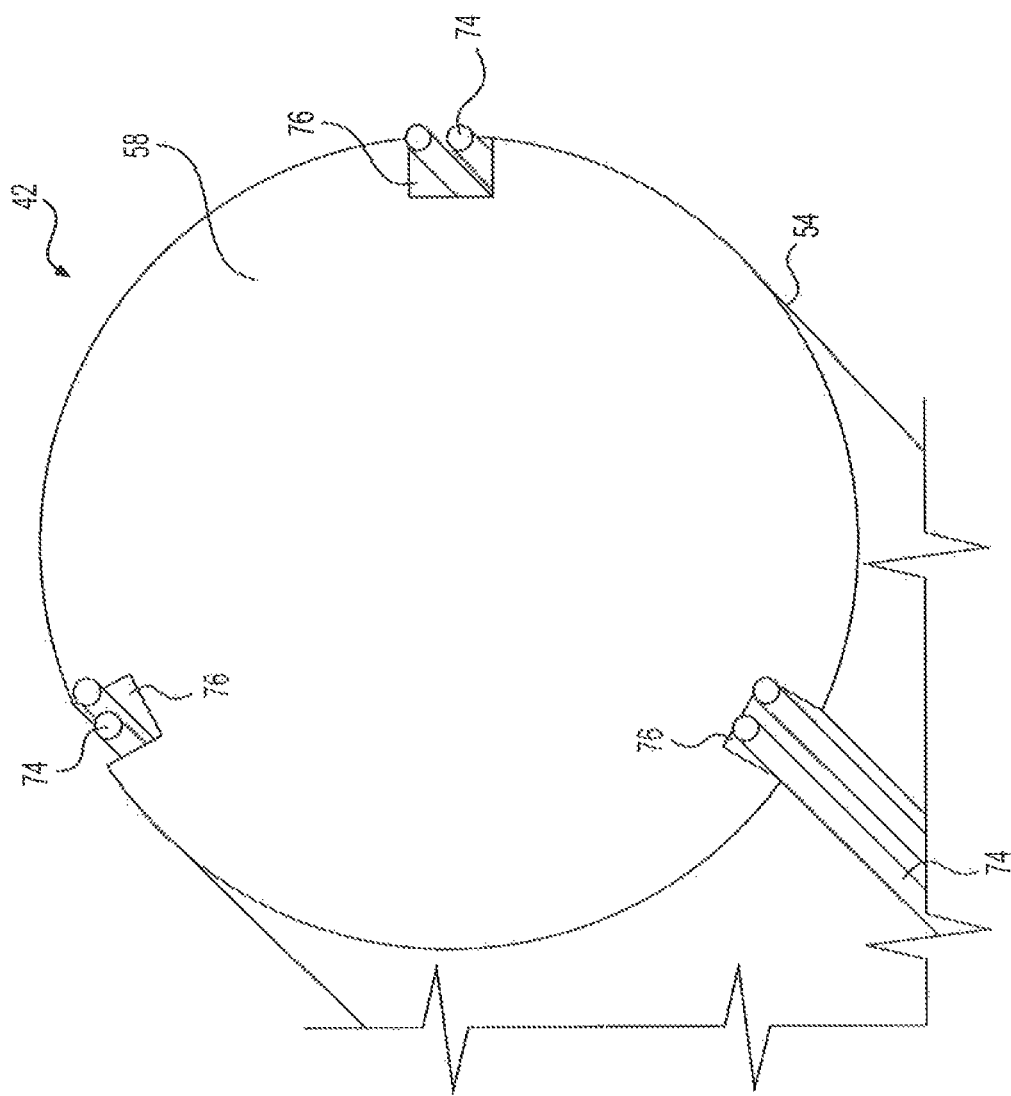
FIG. 4 illustrates a cross-sectional view of the housing of FIG. 3, consistent with disclosed embodiments.

FIG. 4 illustrates a sectional view of the sensing device 42, depicting the plurality of wear members 74 in the plurality of slots 76 of the housing 54. In an exemplary embodiment, the slots 76 are located at an outer periphery of the housing 54, such that the wear members 74 are located on an outer surface of the housing 54 (e.g., located at different radial locations along the outer surface of the housing). It should be understood, however, that the slots 76 may be positioned entirely within a body of the housing 54, such that the wear members 74 are completely surrounded by the material of the housing 54. As shown in FIGS. 3-4, the sensing device 42 may include three wear members 74, each terminating at a different distances from the surface 56 (and thus each corresponding to a different amount of wear).

Figure 5:
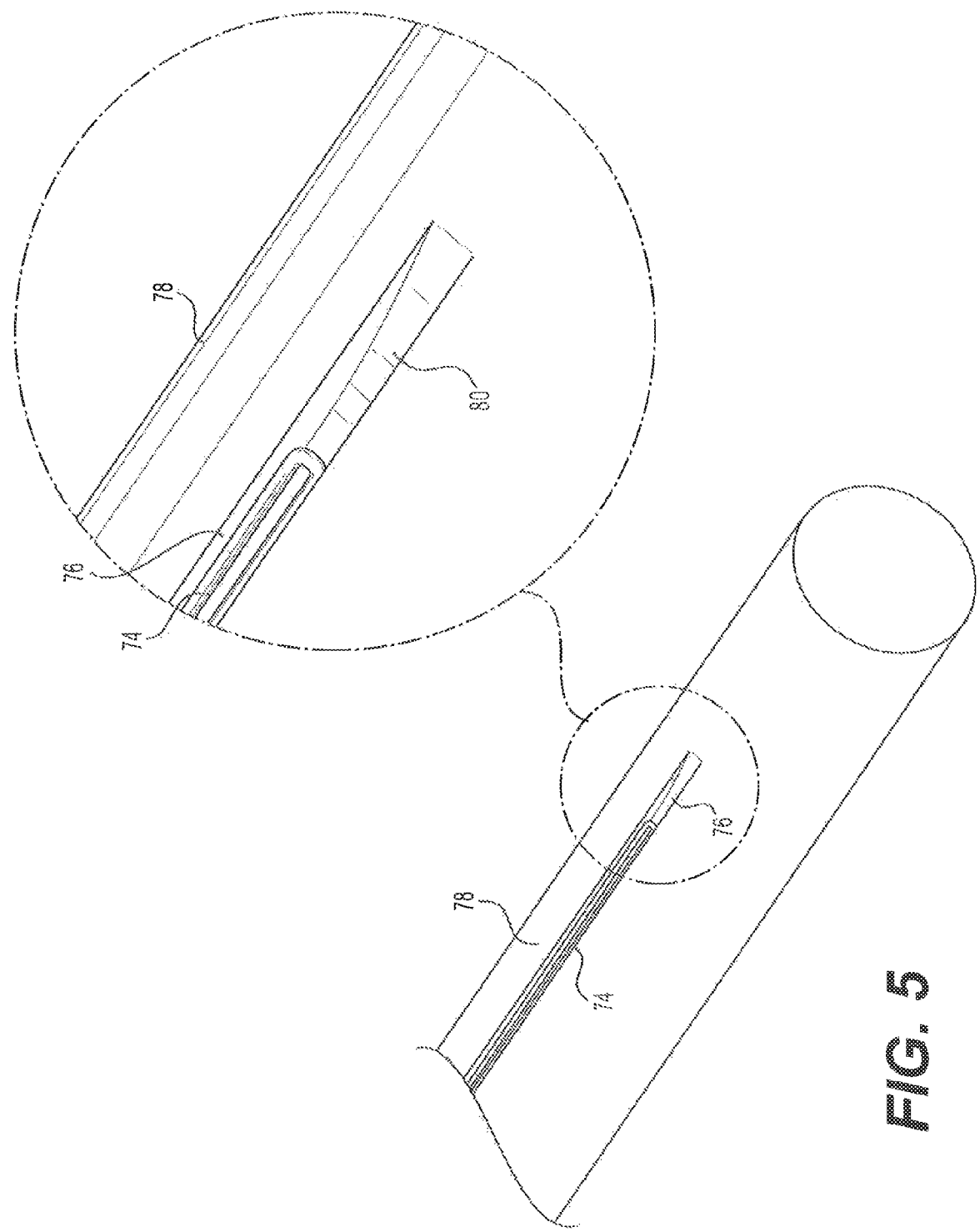
FIG. 5 illustrates a slot formed in the housing of FIG. 3 in more detail, consistent with disclosed embodiments.

FIG. 5 further illustrates a wear member 74 in a slot 76 formed on an exterior of the housing 54. The slot may extend into an outer surface 78 of the housing 54 such that the wear member 74 is located below the outer surface 78. The slot 76 may include an end surface 80 that returns the slot 76 to the outer surface 78, such that the slots 76 do not extend to the surface 56. In this way, foreign materials are inhibiting from entering the slots 76 and damaging the wear members 74 and/or preventing proper operation. In some embodiments, the end surface 80 may be a ramped surface that gradually returns the slot 76 to the outer surface 78.

While an exemplary configuration of the wear sensing device 42 is described herein, it should be understood that other configurations are possible. For example, the wear sensing device may be adapted for use with the ground-engaging member 40, or other component that experiences wear. The sensing device 42 may be configured with a material that wears at the same rate as a surface of which wear is being measured. The sensing device 42 may also be positioned such that wireless communication with the controller 44 is reliable (e.g., including the communication device 72 in a position where it is not enclosed by the corresponding component or the material that wears at the same rate as the component.

INDUSTRIAL APPLICABILITY

The exemplary disclosed a wear sensing device including a housing may be applicable to any component that experiences wear, such as a track or tool component of a mobile machine. The wear sensing device may be used to monitor a wear parameter associated with the component (e.g., a track link, ground-engaging tool, etc.) and automatically transmit a signal indicative of the wear parameter to a computing device for further use. Since wear of a component may be indicative of the remaining life of that component and/or a larger assembly (e.g., a chain assembly of the undercarriage), the disclosed embodiments may allow for a determination of a state of a machine component or assembly (e.g., whether critical wear levels have been reached, structural health, etc.). Further, monitoring of a wear parameter may allow an operator to accurately make inventory part predictions, proactively schedule machine maintenance, and easily and efficiently track wear rates.

In addition, the exemplary disclosed wear sensing device, including a housing that includes a protective section and a communication section, may allow for reliable monitoring of a wear parameter of a machine component. The materials of the different sections may be selected to promote effective performance of the sensing device, including a first material that wears at the same rate as a surface being measured, and a second, different, material that promotes the wireless communication. In this way, the housing may provide protection while enhancing performance of the sensing device. Further, the housing may allow for ease of assembly, since all the components may be combined into one part.

In one embodiment, the sensing device 42 may be manufactured such that the components of the sensing device 42 are arranged within the housing 54. The housing 54 may thereafter be inserted into a bore formed in the body of the component to be monitored for wear. The bore may be substantially the same size and shape as the housing 54 (e.g., cylindrical) such that the housing 54 may be easily inserted and securely held therein. The housing 54 may be secured in position with an adhesive or other securing mechanism.

The housing 54 may be positioned within the component such that the wear sensor 66 is configured to measure wear of a surface of the component, the processing device 68 is configured to generate a signal indicative of the measured wear, and the communication device 72 is configured to transmit the signal to another component, such as the controller 44. As described in the embodiment in which the sensing device 42 is positioned in a track link 26, the housing 54 may be positioned within the body 50 of the track link 26, such that the wear sensor 66 is protected and configured to measure wear of the surface 52 (through measurement of wear of the surface 56). In addition, a section of the housing 54 that includes the communication device 72 is exposed to an exterior of the body 50 (and includes a material that promotes wireless communication) such that a signal indicative of measured wear may be reliably transmitted outside of the housing 54. In the embodiment in which the sensing device 42 is positioned in a track link 26, the communication device may be conveniently located within the link window 62.

In the embodiment in which the wear sensor 66 includes the wear members 74, the sensing device 42 may be configured to generate a signal indicative of the state of the wear members 74. For example, before any material is worn, the sensing device 42 may generate a signal indicating that all of the wear members 74 are intact. As the track link 26 (or other component) is used, the surfaces 52 and 56 will begin to wear away, until a first wear member 74 is reached and broken by the wear. The sensing device 42 may generate a signal indicating that the first wear member 74 is broken, thereby indicating that a corresponding amount of wear (e.g., an amount of wear sufficient to reach the first wear member 74) has occurred. As wear continues, eventually the second and third wear members 74 will be broken, indicating that corresponding amounts of wear have occurred.

The communication device 72 may transmit signals generated by the sensing device 42 to the controller 44. The controller 44 may receive the signal and forward the determined wear parameter to the on-board computer 46 and/or the off-board computer 48. The on-board computer 46 and/or the off-board computer 48 may receive the signal and perform one or more processes to inform an operator of the wear parameter, automatically schedule maintenance, update tracked wear information, estimate a remaining life, of the track link 26 and/or an associated track assembly 14, etc.

Through the exemplary disclosed processes, the sensing device 42 may provide automatic and/or on-demand monitoring of a wear parameter associated with a component (e.g., the track link 26, the ground-engaging member 40, etc). In addition, the configuration of the sensing device 42, including the housing 54 that wears at the same rate as the component, allows for efficient and reliable measurement of wear. For example, the use of a material for the housing that does not wear at the same rate as the component (e.g., resin, plastic, etc.) may result in a concave hole at the sensor location on the surface being measured. This problem may be avoided by using a material that wears at the same rate as the component.

It will be apparent to those skilled in the art that various modifications and variations can be made to the wear sensing device of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A wear sensing device for a track link or a ground-engaging tool, the wear sensing device comprising:
   a wear sensor including a plurality of wear members;
   a communication device;
   a processing device configured to generate a signal indicative of wear based on a state of the plurality of wear members, and transmit the signal with the communication device; and
   a housing at least partially enclosing the wear sensor and including a plurality of separate slots,
   wherein the plurality of wear members are positioned in the plurality of separate slots of the track link or the ground-engaging tool, and
   wherein the wear sensing device is included in the track link or the ground-engaging tool.

2. The wear sensing device of claim 1, wherein the plurality of wear members are each configured to detect a different amount of wear.

3. The wear sensing device of claim 2, wherein the plurality of wear members are wire loops configured to break when a corresponding amount of wear occurs.

4. The wear sensing device of claim 1, wherein the plurality of separate slots are formed on an outer surface of the housing.

5. The wear sensing device of claim 4, wherein the plurality of separate slots are located at different radial locations along the outer surface of the housing.

6. The wear sensing device of claim 5, wherein the plurality of slots each includes include an end surface that returns the slot to the outer surface.

7. The wear sensing device of claim 1, wherein the plurality of separate slots are enclosed within an interior of the housing.

8. The wear sensing device of claim 1, wherein the housing includes a first section made from a first material and a second section made from a second material which is different than the first material.

9. The wear sensing device of claim 8, wherein the first section is made of a material configured to protect the plurality of wear members and the processing device, and wherein the second section is made of a material configured to allow transmission of a signal therethrough.

10. The wear sensing device of claim 9, wherein the first section is made from a metal material and the second section is made from a polymer material.

11. A machine component, comprising:
a component body including a wear surface; and
a wear sensing device, including:
a wear sensor including a plurality of wear members,
a communication device,
a processing device configured to generate a signal indicative of wear based on a state of the plurality of wear members, and transmit the signal with the communication device, and
a housing at least partially enclosing the wear sensor and including a plurality of slots having the plurality of wear members separately positioned therein and including a surface that is continuous with the wear surface,
wherein the housing includes a material configured to wear at substantially the same rate as the wear surface, and
wherein the machine component is a track link or a ground-engaging tool.

12. The machine component of claim 11, wherein the wear surface is an engagement surface of the track link configured to contact a roller.

13. The machine component of claim 11, wherein the housing is positioned in a bore formed in the track link.

14. The machine component of claim 13, wherein the track link includes a link window, and the communication device is positioned in the link window.

15. The machine component of claim 11, wherein the housing includes:
a first section that includes the material configured to wear at substantially the same rate as the wear surface, and
a second section that includes a material that is configured to allow transmission of a signal therethrough.

16. The machine component of claim 15, wherein the second section includes a cap enclosing an end of the housing.

17. The machine of claim 15, wherein the second section is positioned in a link window of the track link.

18. A machine including:
a frame;
a track assembly including a drive sprocket, a chain assembly, a traction assembly, an idler assembly, and a roller assembly, the track assembly configured to propel the machine;
wherein the chain assembly includes a track link, the track link including:
a component body including a wear surface; and
a wear sensing device, including:
a wear sensor including a plurality of wear members,
a communication device,
a processing device configured to generate a signal indicative of wear based on a state of the plurality of wear members, and transmit the signal with the communication device, and
a housing at least partially enclosing the wear sensor and including:
a first section including a plurality of slots having the plurality of wear members separately positioned therein and including a surface that is continuous with the wear surface, and
a second section adjacent to the communication device;
wherein the first section includes a material configured to wear at substantially the same rate as the wear surface, and
wherein the second section includes a material, different from the material of the first section, that is configured to allow transmission of a signal therethrough.

19. The machine of claim 18, wherein the first section is made from a metal material,
wherein the second section is made from a polymer material, and
wherein the second section is positioned in a link window of the track link.

20. The machine of claim 18, wherein the plurality of wear members are each configured to detect a different amount of wear.

* * * * *